(No Model.)
O. F. BOOMER.
EVAPORATING APPARATUS.
No. 271,023. Patented Jan. 23, 1883.
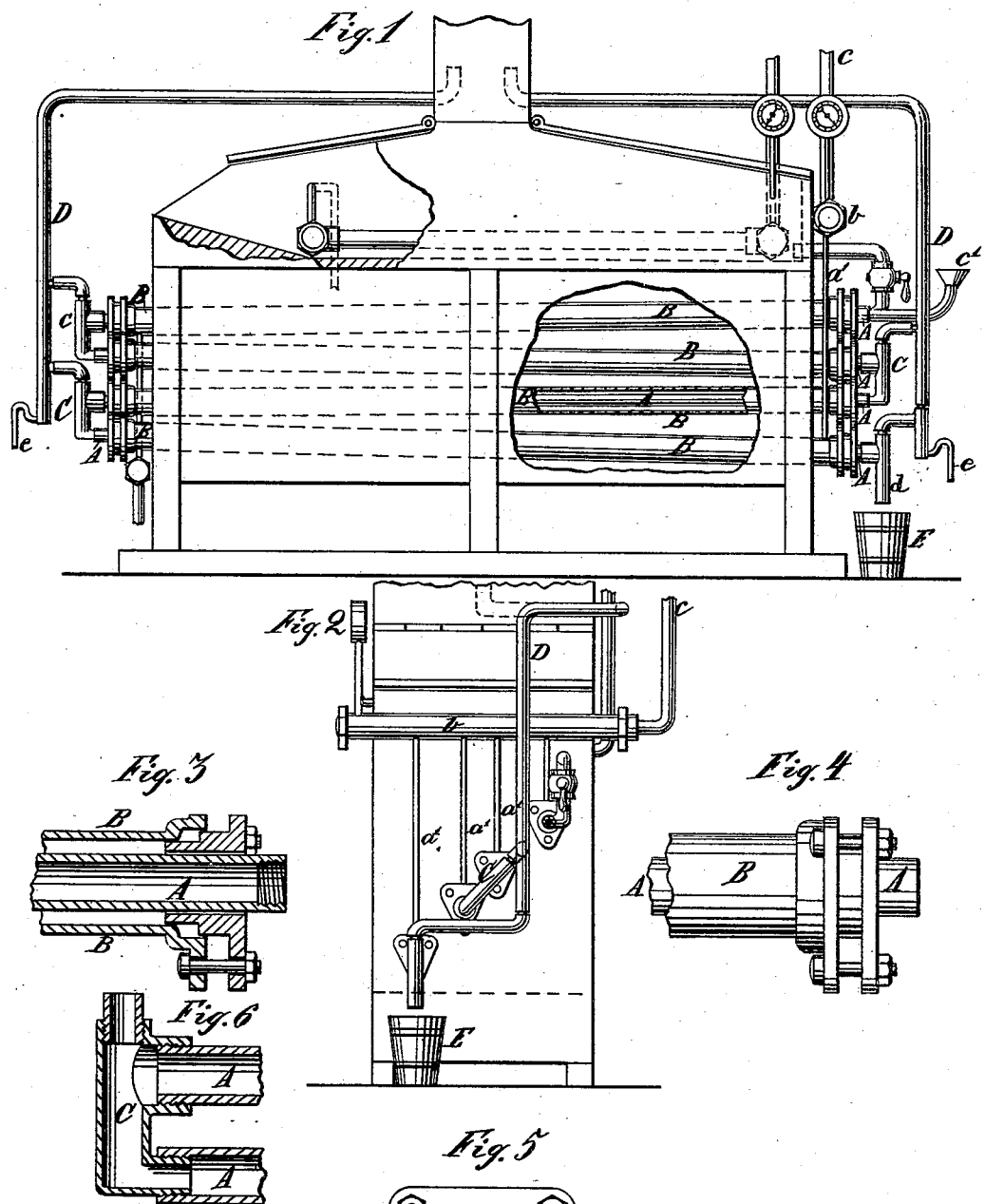
Witnesses:
O. F. Malmborg,
Thomas E. Crossman
Inventor:
Oscar F. Boomer,
by James A. Whitney
Attorney

UNITED STATES PATENT OFFICE.

OSCAR F. BOOMER, OF BROOKLYN, NEW YORK.

EVAPORATING APPARATUS.

SPECIFICATION forming part of Letters Patent No. 271,023, dated January 23, 1883.

Application filed June 12, 1882. (No model.)

*To all whom it may concern:*

Be it known that I, OSCAR F. BOOMER, of Brooklyn, in the county of Kings and State of New York, have invented certain Improvements in Evaporating Apparatus, of which the following is a specification.

This invention relates to that class of evaporating apparatus in which the liquid to be evaporated is caused to pass through heated tubes.

The object of my said invention is to facilitate the escape of the vapor from the tubes, and at the same time to facilitate the passage of the liquid undergoing treatment from one tube to another, thereby greatly increasing the evaporative action of the apparatus, and thereby diminishing the time required and the expense involved in the operation of evaporation.

My invention comprises a novel combination of parts whereby said object is effectually secured.

Figure 1 is a side elevation of an apparatus constructed according to my said invention. Fig. 2 is an end view of the same; and Figs. 3, 4, 5, and 6 are detail views, on a larger scale, of certain parts of the apparatus embraced in my said invention.

A are the evaporating-tubes, arranged one above another, each tube being at a slight angle from a horizontal position, and also at a slight angle to those next above and below it, in order that as the liquid is passed from one tube to another, as hereinafter explained, it may flow steadily in succession through the tubes from the topmost to the lowermost one. Each of the tubes A is surrounded by a steam-jacket, B, the steam-jacket of each tube communicating by branch pipes $a'$ with a larger pipe, $b$, which, in its turn, is connected by a pipe, $c$, with a boiler or suitable source of steam-supply, the arrangement being such that steam passed into or through the said steam-jackets may uniformly heat the several tubes. The lowermost end of each tube B is connected with the uppermost end of that next below by a chamber, C. This chamber is of sufficient capacity to readily receive and transmit all the vapor that passes out of the tubes connected therewith, especially of the lowermost tubes connected therewith. The bottom of each chamber is substantially flush or level with the lower part of the lowermost tube connected therewith, so that any liquid in such chamber will flow into the said lowermost tube. The said chambers are connected one with another by means of a pipe, D, of sufficient capacity to carry off all the vapors passed thereto from the series of chambers connected therewith, as just described. This pipe D may be extended to any desired locality to which it is desired to transmit the vapor passed from the apparatus.

The liquid to be evaporated is passed into the uppermost of the tubes A, at an inlet, $c'$, in such quantity that in its passage through the tubes A it will only partially fill the same. The said liquid, subjected in said tubes to the action of the heat transmitted from the steam-jackets, is of course more or less evaporated, the vapors passing into the adjacent chamber C, and thence out through the pipe D, while the liquid, descending to the bottom of said adjacent chamber C, passes into the next pipe below, thence into the next chamber, and so on down to the outlet $d$, the vapors escaping into each chamber C, and thence through the pipe D, while the liquid, becoming more and more concentrated, makes its exit at the outlet $d$, where it may be received by any suitable receiver or receptacle, E. The water resulting from the condensation of vapor in the pipe D flows from the latter through small open-ended pipes $e$.

What I claim as my invention is—

1. The combination, with the oppositely-inclined steam-jacketed tubes A, of the chambers C, arranged to provide a connection to the said tubes at alternate ends, and constructed to insure the passage of the liquid from one tube to another, and at the same time to permit the free escape of the vapors or vapor, substantially as and for the purpose herein set forth.

2. The combination of the tube D with the chambers C and oppositely-inclined steam-jacketed tubes A, the said chambers C being constructed and arranged to transmit liquid from one to another of the said tubes, and at the same time to insure the transmission of the vapors or vapor to the pipe D, all substantially as and for the purpose herein set forth.

3. The combination of the steam-jackets of the tubes A with the branch pipes $a'$, pipe $b$, and a pipe for supplying steam from a suitable generator or source of supply, substantially as and for the purpose herein set forth.

OSCAR F. BOOMER.

Witnesses:
THOMAS E. CROSSMAN,
CHARLES P. BLINN.